Apr. 24, 1923.
H. R. RUMFORD
1,453,187
MEANS FOR VAPORIZING HYDROCARBON FUELS
Filed Feb. 18, 1921
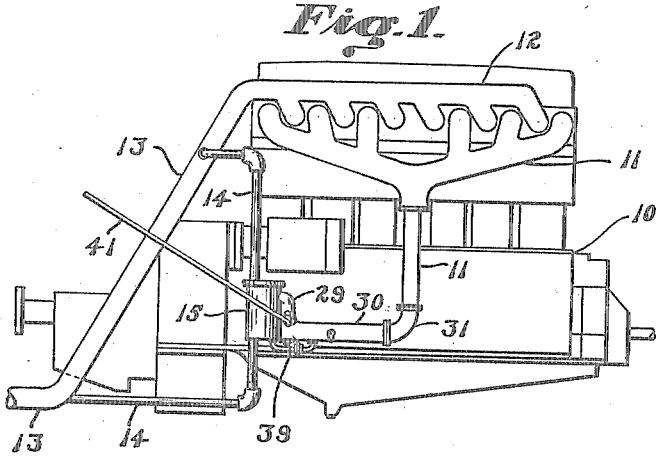
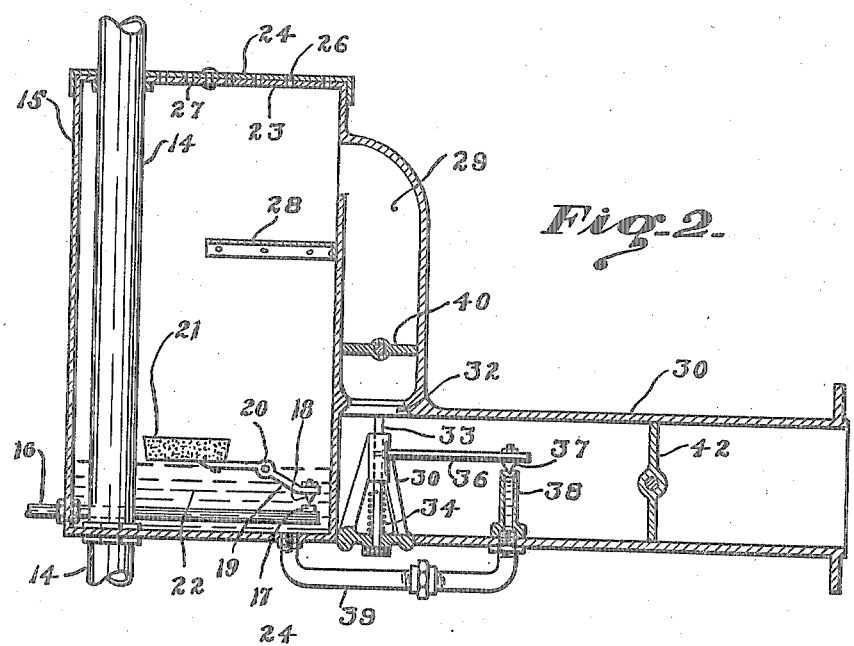
Harry R. Rumford
INVENTOR
WITNESS:
BY Victor J. Evans
ATTORNEY Patented Apr. 24, 1923.                                              1,453,187

UNITED STATES PATENT OFFICE.

HARRY ROBINSON RUMFORD, OF CHESTER, PENNSYLVANIA, ASSIGNOR OF ONE-HALF TO WALTER A. LANDRY, OF CHESTER, PENNSYLVANIA.

MEANS FOR VAPORIZING HYDROCARBON FUELS.

Application filed February 18, 1921. Serial No. 446,141.

*To all whom it may concern:*

Be it known that I, HARRY R. RUMFORD, a citizen of the United States, residing at Chester, in the county of Delaware and State of Pennsylvania, have invented new and useful Improvements in Means for Vaporizing Hydrocarbon Fuels, of which the following is a specification.

This invention relates to internal combustion engines and it has more particular reference to the means for supplying a combustible mixture in a separate unit, the primary object being to provide a means through the agency of heat applied either by electricity, hot water, friction or piping from the exhaust system whereby the gasoline or the like is thoroughly vaporized, steamed, fumed or otherwise converted into a vaporous substance for utilization after its entry into the engine manifold.

Another object is to provide a novel structure whereby gasoline or the like is thoroughly vaporized prior to its entry into the engine manifold of an internal combustion engine.

A further object is to provide internal combustion engines with a novel means whereby a considerable economy is effected in the amount of fuel consumed per horsepower, whilst a greatly increased efficiency is attained in the mileage capacity.

A still further object of this invention is to provide the internal combustion engines of self-propelled vehicles with a novel vaporizing means whereby their efficiency in taking steep grades when running on high gear is very materially enhanced.

With the foregoing and other objects in view as will later on be more apparent as this description proceeds my invention consists essentially in the novel features of construction, combination and arrangement of parts hereinafter fully described and more specifically defined by the appended claims.

In the further disclosure of my invention reference is to be had to the accompanying sheet of explanatory drawings constituting a part of this specification, and in which like characters of reference designate the same or corresponding parts in all the views.

Figure 1 – is a side elevation of an internal combustion engine having my improved vaporizing means fitted thereto.

Figure 2 – is a vertical section through my improved vaporizing means as shown in the preceding figure but drawn to an enlarged scale for the sake of clearness; and Figure 3 – is a fragmentary plan of the upper portion or cover of the fuel-chamber.

Referring to the drawings the numeral 10 designates an internal combustion engine of any of the well-known types applicable for driving motor-vehicles, 11 the intake manifold therefor, 12 the exhaust manifold, and 13 the exhaust pipe connecting with a silencer—not shown—or the atmosphere, all of said parts being in accordance with the well-known arrangements.

According to my invention I connect into the exhaust pipe 13 an auxiliary exhaust collecting pipe 14 which traverses a fuel reservoir 15 supplied by the feed pipe 16 the inner end whereof is fitted with an outlet 17 under the control of a check valve 18 carried by an arm 19 pivotally mounted at 20 and actuable by a float 21 which reposes on the surface of the fuel 22 in the aforesaid reservoir 15. The reservoir 15 is provided with an imperforate crown 23 over which is pivotally mounted a cover or cap 24 similarly perforated and arcuately holed at 25 to permit of its partial rotation to the right or left-hand relative to the auxiliary collecting pipe 14 as well as for bringing holes 26 therein in register with holes 27 in the crown 23.

Transversely of the reservoir 15 there is fitted a baffle 28 which prevents the fuel 22 from splashing into the vapor outlet conduit or passage 29 which is conveniently provided and vertically disposed at one side of said reservoir and connects with a horizontal pipe 30 which in turn is jointed by an elbow 31 to the intake manifold 11. The lower end of the conduit 29 is under the control of an upwardly seating valve 32 carried by a rod or stem 33 and being conveniently mounted in a bearing 35. Laterally projecting from the stem 33 is a rod or arm 36 which is fitted with a ball and socket check valve 37 adapted to close a jet 38 connecting by a pipe 39 with the bottom of the reservoir 15. A butterfly or choke valve 40 is fitted in the conduit or passage 29 and is under the control of the choke rod 41 connecting with the dash of the vehicle, whilst a second throttle 42 is fitted in the pipe 30 for controlling the amount of vaporized fuel fed to the motor and it is operated by the usual throttle control—not shown—on the steering column.

Briefly summarizing it will be seen that the upwardly seating valve 32 is automatic in action and that its movements are simultaneously imparted to the jet check valve 37 when the choke valve 40 is closed, furthermore it is to be noted that my improved vaporizing means takes the place of the ordinary carburetor.

In use and assuming that the reservoir 15 has been supplied with a sufficient quantity of gasoline—approximately to the level shown—it will be readily seen that said gasoline will become vaporized by the warm exhaust gases passing through the auxiliary collecting pipe 14 which being mixed with the requisite proportion of air admitted through the perforate cap 24 and crown 23, the mixture thus created being drawn by the suction of the engine or motor through the conduit 29, past the valve 32 and through the pipe 30 to the intake manifold 11. Furthermore it will also be clearly seen that the float 21 automatically controls the flow of gasoline by opening and closing the check valve 18. When the choke valve 40 is open the suction created by the running of the engine or motor will open the upwardly seating valve 32 and simultaneously close the ball and socket check valve 37. Now when the jet 38 is thus closed it will be apparent that the engine or motor is operated or running on the vapor generated about that part of the exhaust collecting pipe 14 which is located in the reservoir 15. When the motor is cold it will be obvious there will be no vaporized fuel and that the valve 32 will automatically close thereby opening the check valve 37 and permitting raw gas to be drawn through the jet 38 which mixing with the air entering through the perforations 26, 27, will provide the necessary mixture for starting the engine or motor 10. After the engine or motor 10 has been running long enough to sufficiently warm the pipe 14 by the priming charge it will be obvious that a vaporized mixture will be generated in the reservoir, whereupon the choke valve 40 will be opened and the motor continuously run by said vaporized mixture without any wastage.

With the foregoing arrangement of parts I have found that an enormous saving in gasoline is effected, and whilst I have shown and described the best form of my invention at present known to me, it will be obvious that the device is capable of considerable modification without departing from its spirit, and the right is hereby reserved to include all such reasonable changes and other modifications as fairly fall within the scope of the appended claims.

Having described my invention what I claim as new and desire to secure by Letters Patent is:—

1. The combination with the intake manifold and the exhaust of an internal combustion engine of a reservoir adapted to receive a supply of hydrocarbon, means for regulating a supply of atmospheric air into the reservoir, float mechanism for controlling the supply of hydrocarbon to the reservoir, an auxiliary collecting pipe connecting with the exhaust and passing through the reservoir, a baffle in the reservoir for preventing raw hydrocarbon from splashing into the vaporized mixture, a conduit from the reservoir to the intake manifold having spaced choke and throttle valves therein, a spring-influenced valve intermediate the choke and throttle valves, and an auxiliary connection controllable by the spring-influenced valve for supplying raw hydrocarbon to the intake manifold when the engine is cold.

2. The combination with the intake manifold and the exhaust of an internal combustion engine of a reservoir adapted to receive a supply of hydrocarbon, means for regulating a supply of atmospheric air into the reservoir, float mechanism for controlling the supply of hydrocarbon to the reservoir, an auxiliary collecting pipe connecting with the exhaust and passing through the reservoir, a baffle in the reservoir for preventing raw hydrocarbon from splashing into the vaporized mixture, a conduit from the reservoir to the intake manifold having spaced choke and throttle valves therein, a spring-influenced valve intermediate the choke and throttle valves for shutting off the former when the engine is cold, and a connection operable synchronously with the spring-influenced valve for shutting off an auxiliary jet connection from the reservoir when the engine is cold.

In testimony whereof I affix my signature.

HARRY ROBINSON RUMFORD.